(12) United States Patent
Chang et al.

(10) Patent No.: US 6,335,830 B1
(45) Date of Patent: Jan. 1, 2002

(54) DOUBLE-PASS FOLDED INTERLEAVER/DEINTERLEAVERS

(75) Inventors: Kok-Wai Chang, Sunnyvale; Kuochou Tai, Freemont, both of CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/476,034

(22) Filed: Dec. 31, 1999

(51) Int. Cl.[7] .............................. G02B 5/30; H01J 14/00
(52) U.S. Cl. ...................... 359/498; 359/494; 359/495; 359/497; 359/499; 359/115; 359/124
(58) Field of Search .................................. 359/494, 495, 359/496, 497, 498, 115, 124, 127, 129, 128, 156, 499, 122; 385/11, 15, 16, 27, 47

(56) References Cited

U.S. PATENT DOCUMENTS

| | | | |
|---|---|---|---|
| 4,464,022 A | | 8/1984 | Emkey |
| 4,474,434 A | | 10/1984 | Carlsen et al. |
| 4,474,435 A | | 10/1984 | Carlsen et al. |
| 4,514,046 A | | 4/1985 | Carlsen et al. |
| 4,566,761 A | | 1/1986 | Carlsen et al. |
| 4,685,773 A | | 8/1987 | Carlsen et al. |
| 4,744,075 A | * | 5/1988 | Buhrer ........................ 359/495 |
| 4,745,591 A | * | 5/1988 | Foley ......................... 359/495 |
| 4,987,567 A | * | 1/1991 | Buhrer ........................ 359/495 |
| 5,204,771 A | | 4/1993 | Koga .......................... 359/281 |
| 5,414,540 A | * | 5/1995 | Patel et al. ..................... 385/17 |
| 5,471,340 A | | 11/1995 | Cheng et al. ................ 359/484 |
| 5,488,500 A | | 1/1996 | Glance ........................ 359/127 |
| 5,546,219 A | * | 8/1996 | Iida ............................. 359/495 |
| 5,611,004 A | | 3/1997 | Chang et al. .................. 385/11 |
| 5,694,233 A | | 12/1997 | Wu et al. ..................... 359/127 |
| 5,712,717 A | | 1/1998 | Hamel et al. ................. 359/130 |
| 5,724,165 A | | 3/1998 | Wu ............................. 359/117 |
| 5,737,104 A | | 4/1998 | Lee et al. .................... 359/124 |
| 5,764,825 A | | 6/1998 | Mugino et al. ................ 385/24 |

(List continued on next page.)

FOREIGN PATENT DOCUMENTS

JP    60-59318 A   *   4/1985

OTHER PUBLICATIONS

E.O. Ammann, "Synthesis of Optical Birefringent Networks", Progress in Optics, 1971, pp. 123–177, vol. IX, North–Holland Publishing Company, Amsterdam.

(List continued on next page.)

Primary Examiner—Cassandra Spyrou
Assistant Examiner—John Juba, Jr.
(74) Attorney, Agent, or Firm—Lacasse & Associates; Randy W. Lacasse; Kevin E. Greene

(57) ABSTRACT

Interleaver/deinterleaver apparatuses for combining/separating optical channels are described. An interleaver/deinterleaver apparatus is described as folded when an optical signal is directed through a single crystal multiple times. Double-pass refers to the optical signal following a (folded) path through the apparatus twice. When operating as an deinterleaver, the interleaver/deinterleaver separates an optical signal (e.g., WDM signal) into subsets of optical signals (e.g., channels). In one embodiment, deinterleaving optical signals separates an optical signal into even and odd International Telecommunications Union (ITU) channels. When operating as an interleaver, the interleaver/deinterleaver mixes subsets of optical signals (e.g., channels) into a multiplexed (e.g., WDM) optical signal. The interleaver/deinterleaver apparatus can be used to increase the bandwidth of an optical network. For example, the interleaver/deinterleaver can be used to interface components designed for a first channel spacing (e.g., 100 GHz) to components designed for a second channel spacing (e.g., 200 GHz). In one embodiment, interleaveing combines even and odd ITU channels into a single optical signal.

22 Claims, 14 Drawing Sheets

U.S. PATENT DOCUMENTS

| | | | |
|---|---|---|---|
| 5,778,118 A | 7/1998 | Sridhar | 385/24 |
| 5,808,763 A | 9/1998 | Duck et al. | 359/127 |
| 5,822,095 A | 10/1998 | Taga et al. | 359/127 |
| 5,835,517 A | 11/1998 | Jayaraman et al. | 372/50 |
| 5,852,505 A | 12/1998 | Li | 359/118 |
| 5,867,291 A | 2/1999 | Wu et al. | 359/124 |
| 5,912,748 A * | 6/1999 | Wu et al. | 359/117 |
| 5,915,051 A | 6/1999 | Damask et al. | 385/16 |
| 5,926,587 A | 7/1999 | Chen et al. | 385/14 |
| 5,930,039 A | 7/1999 | Li et al. | 359/484 |
| 5,974,205 A | 10/1999 | Chang | 385/11 |
| 6,002,503 A | 12/1999 | Mizrahi | 359/124 |
| 6,049,404 A * | 4/2000 | Wu et al. | 359/117 |
| 6,061,484 A | 5/2000 | Jones et al. | 385/24 |

OTHER PUBLICATIONS

Shaoping Bian, Kebin Xu, & Jing Hong, "Optical Perfect Shuffle Using Wollaston Prisms", Applied Optics, Jan. 10, 1991; pp. 173–174, vol. 30, No. 2, USA.

Jack L. Jewell, S.L. McCall, Y.H. Lee, A. Scherer, A.C. Gossard, & J.H. English, "Optical Computing and Related Microoptic Devices", Applied Optics, Dec. 1, 1990, pp. 5050–5053, vol. 29, No. 34, USA.

Miles Murdocca, "Connection Routing for Microoptic Systems", Applied Optics, Mar. 10, 1990, pp. 1106–1110, vol. 29, No. 8, USA.

Kazuhiro Noguchi, Toshikazu Sakano, & Takao Matsumoto, "A Rearrangeable Multichannel Free–Space Optical Switch Based on Multistage Network Configuration", Journal of Lightwave Technology, Dec. 1991, pp. 1726–1732, vol. 9, No. 12, USA.

K. Shiraishi, T. Sato, & S. Kawakami, "Experimental Verification of a Form–Birefringent Polarization Splitter", Applied Physics Letters, Jan. 21, 1991, pp. 211–212, vol. 58, No. 3, USA.

Masataka Shirasaki & Kunihiko Asama, "Compact Optical Isolator for Fibers Using Birefringent Wedges", Applied Optics, Dec. 1, 1982, pp. 4296–4299, vol. 21, No. 23, USA.

Yariv & Yeh, "Jones Calculus and its Application to Birefringent Optical Systems", Optical Waves in Cyrstals, 1984, pp. 120–154, John Wiley & Sons, Canada.

E. O. Ammann, "Synthesis of Electro–Optic Shutters having a Prescribed Transmission vs Voltage Characteristic", Journal of the Optical Society of America, Aug. 1966, pp. 1081–1088, vol. 56, No. 8, USA.

S.E. Harris, E.O. Ammann & I.C. Chang, "Optical Network Synthesis Using Birefringent Crystals", Journal of the Optical Society of America, Oct. 1964, pp. 1267–1279, vol. 54, No. 10, USA.

Benjamin B. Dingel & Masayuki Izutsu, "Multifunction Optical Filter with a Michelson–Gires–Tournois Interferometer for Wavelength–Division–Multiplexed Network System Applicatons", Optical Letters; Jul. 15, 1998; pp. 1099–1101, vol. 23, No. 14, Optical Society of America, USA.

Benjamin B. Dingel & Tadashi Aruga, "Properties of a Novel Noncascaded Type, Easy–to–Design, Ripple–Free Optical Bandpass Filter", Journal of Lightwave Technology, Aug. 1999, pp. 1461–1469, vol. 17, No. 8, USA.

* cited by examiner

DOUBLE-PASS FOLDED INTERLEAVER/ DEINTERLEAVERS

RELATED APPLICATIONS

The present U.S. patent application is related to U.S. patent application Ser. No. 09/476,611, entitled "MULTI-PASS FOLDED INTERLEAVER/DEINTERLEAVERS" which is filed concurrently with the present U.S. patent application.

FIELD OF THE INVENTION

The invention relates to optical devices. More particularly, the invention relates to an interleaver/ deinterleaver having a folded design such that an optical signal passes through a single crystal multiple times.

BACKGROUND OF THE INVENTION

As telecommunications usage increases as a result of, for example increased Internet usage, increased types of communications, and population growth, telecommunications providers are required to provide greater voice- and data-carrying capacity. In order to reduce cost and the amount of time required to provide the increased capacity wavelength division multiplexing (WDM) and dense wavelength division multiplexing (DWDM) have been developed, which provide increased capacity without requiring new fiber optic cables.

WDM and DWDM technologies combine multiple optical signals into a single fiber by transporting different signals on different optical wavelengths or channels. Interleaving and deinterleaving of optical channels is typically accomplished with thin film optical filters. However, multiple layers of film are required to interleave and deinterleave multiple channels, which increases the cost and complexity of a component. Another disadvantage of multiple layers of thin film for filtering is that the thin films break down over time, especially when operating under high power conditions.

What is needed is an improved optical device for use with WDM and/or DWDM optical signals. Prior attempts to improve optical devices are disclosed in U.S. Pat. No. 4,566,761 issued Jan. 28, 1986 to Carlsen et al, U.S. Pat. No. 4,685,773 issued Aug. 11, 1987 to Carlsen et al, and U.S. Pat. No. 5,694,233 issued Dec. 2, 1997 to Wu et al, which are incorporated herein by reference.

SUMMARY OF THE INVENTION

The present invention relates to an interleaver/ deinterlever apparatus comprising:

a first port for inputting or outputting a first polarized optical signal comprising a second signal with a first subset of channels, and a third signal with a second subset of channels;

a second port for outputting or inputting the second signal;

a third port for outputting or inputting the third signal;

a birefringent assembly optically coupled to the first, second and third ports;

a plurality of reflective elements positioned to reflect the first optical signal a plurality of times through the birefringent assembly along a first optical path or for reflecting the second and third signals a plurality of times through the birefringent assembly along second and third paths, respectively, thereby providing the first subset of channels with a different polarization than the second subset of channels;

a first beam splitter/combiner positioned to receive the optical signals from the birefringent assembly, for separating the first subset of channels from the second subset of channels or for combining the first subset of channels with the second subset of channels; and a mirror positioned to reflect the first and second subsets of channels separately back to the birefringent assembly and the plurality of reflective elements for a second pass through the birefringent assembly along the second and third optical paths, respectively, that are parallel to the first optical path or to reflect the first and second subsets of channels together back to the birefringent assembly and the first reflecting means for another pass through the birefringent assembly along the first optical path;

wherein the first optical signal received via the first port is separated into the first subset and the second subset and directed to the second port and the third port, respectively, or wherein optical signals received via the second port and the third port are combined and directed to the first port.

Another aspect of the present invention relates to an apparatus comprising:

a birefringent assembly;

first reflecting means for reflecting an optical signal such that the optical signal makes multiple passes through the birefringent assembly following a predetermined path a first time;

first polarization rotator for reorienting the polarization of the optical signal after at least one of the passes through the birefringent assembly, whereby after making the multiple passes through the birefringent assembly for the first time only a first subset of optical channels in the optical signal have a first polarization; and second reflecting means for reflecting the optical signal such that the optical signal traverses the predetermined path or a path parallel thereto for a second time through the birefringent assembly, in an opposite direction to the first time.

BRIEF DESCRIPTION OF THE DRAWINGS

The invention is illustrated by way of example, and not by way of limitation in the figures of the accompanying drawings in which like reference numerals refer to similar elements.

FIG. 7b illustrates a side view of the multi-pass optical interleaver/deinterleaver of FIG. 8a.

DETAILED DESCRIPTION

Double-pass folded interleaver/deinterleavers are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Interleaver/deinterleaver apparatuses for combining/separating optical channels are described. An interleaver/deinterleaver apparatus is described as folded when an optical signal follows an optical path that passes through a birefringent assembly multiple times. Double-pass refers to the optical signal following a (folded) path through the birefringent assembly twice. When operating as an deinterleaver, the interleaver/deinterleaver separates an optical signal (e.g., WDM signal) into subsets of optical signals (e.g., channels). In one embodiment, deinterleaving optical signals separates an optical signal into even and odd International Telecommunications Union (ITU) channels.

When operating as an interleaver, the interleaver/deinterleaver mixes subsets of optical signals (e.g., channels) into a multiplexed (e.g., WDM) optical signal. The interleaver/deinterleaver apparatus can be used to increase the bandwidth of an optical network. For example, the interleaver/de-interleaver can be used to interface components designed for a first channel spacing (e.g., 100 GHz) to components designed for a second channel spacing (e.g., 200 GHz). In one embodiment, interleaving combines even and odd ITU channels into a single optical signal.

Figure 1:
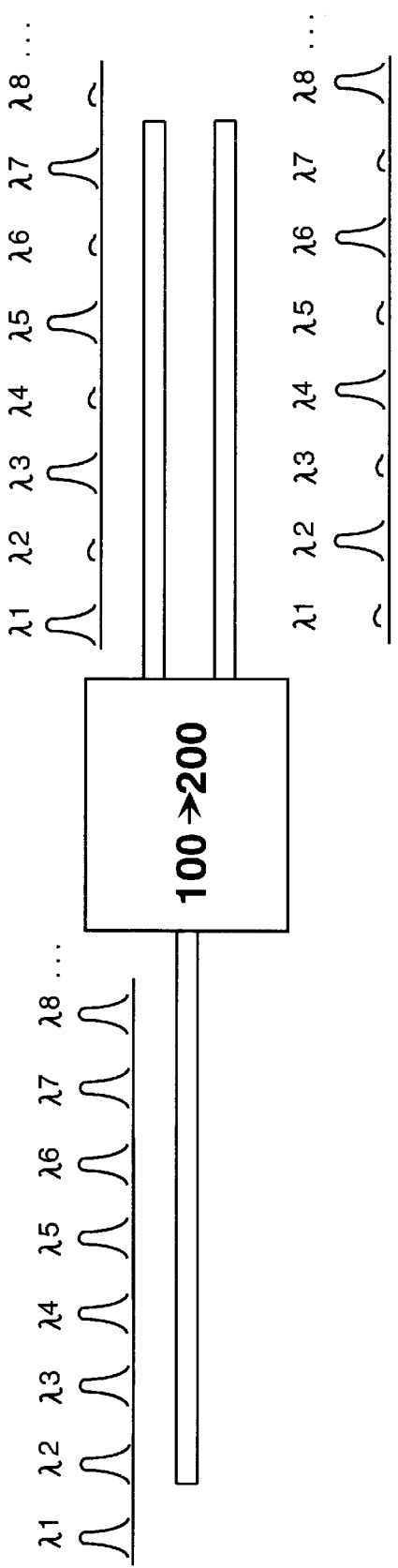
FIG. 1 is a conceptual illustration of a conversion from an optical channel scheme having 100 GHz spacing to an optical channel scheme having 200 GHz.

FIG. 1 is a conceptual illustration of a conversion from an optical channel scheme having 100 GHz spacing to an optical channel scheme having 200 GHz. The conversion of FIG. 1 is useful, for example, to allow devices designed to operate with an optical channel scheme having 200 GHz channel spacing to interact with other devices or a network designed to operate with an optical channel scheme having 100 GHz channel spacing. Conversion between 100 GHz channel spacing and 200 GHz channel spacing allows, for example, network bandwidth to be increased without upgrading all of the devices that interact with the network.

In one embodiment, the converter of FIG. 1 is a deinterleaver that separates an optical signal having even and odd channels (e.g., ITU channels) into a first optical signal including the even channels and a second optical signal including the odd signals. After the signals are deinterleaved, the odd channels have a 200 GHz spacing and the even channels have a 200 GHz spacing. Recombining the even and the odd channels can be accomplished with an interleaver that combines the odd channels and the even channels into a single optical signal. In other words, the even and odd channels having 200 GHz spacing are combined (interleaved) into an optical signal having 100 GHz signal spacing. Similar interleaving can be provided to convert between 50 GHz spaced channels and 100 GHz spaced channels, as well as between other sets of channel spacing schemes.

Figure 2:
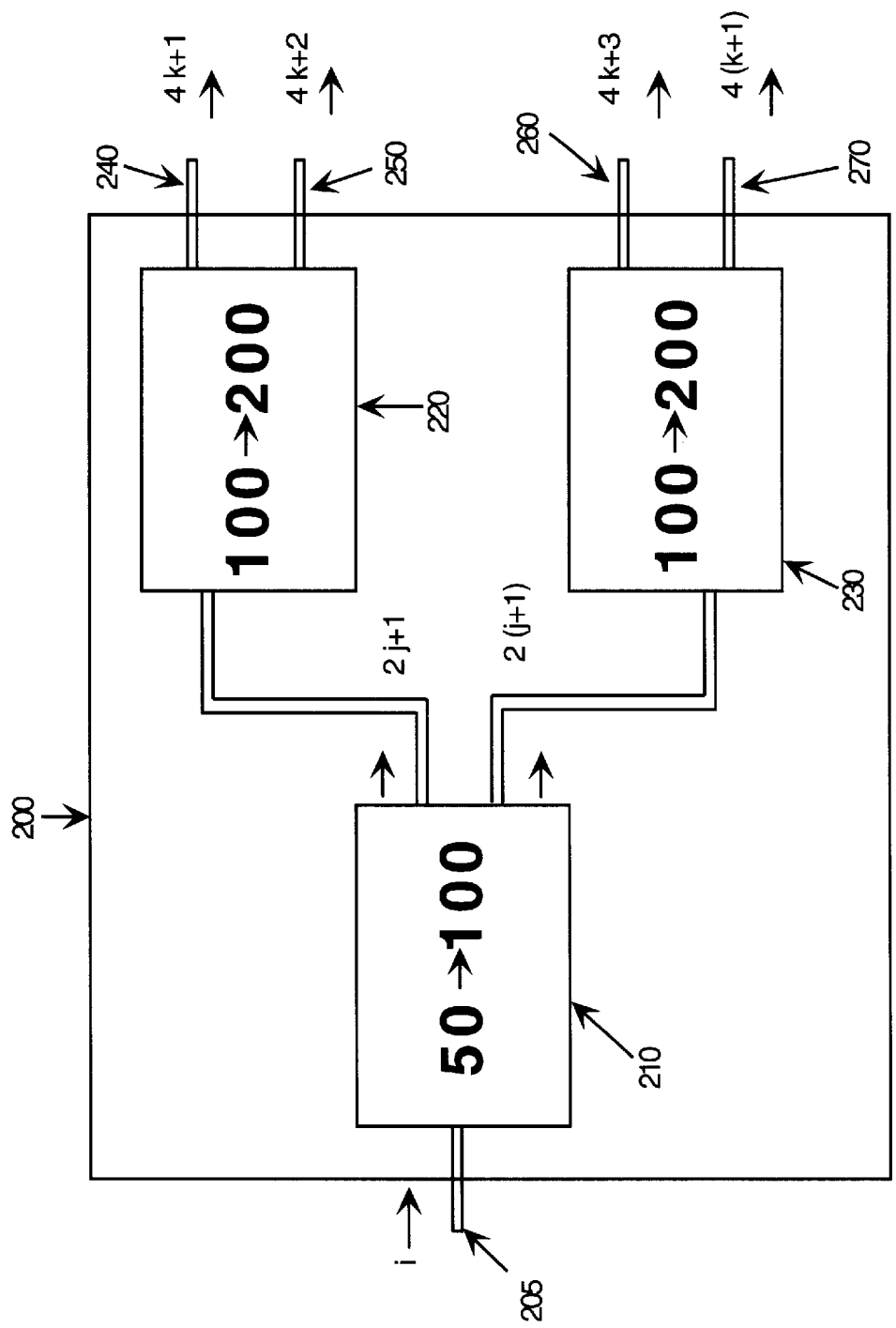
FIG. 2 is a block diagram of an optical deinterleaver for conversion from an optical channel scheme having 50 GHz spacing to an optical channel scheme having 200 GHz spacing.

FIG. 2 is a block diagram of an optical deinterleaver for conversion from an optical channel scheme having 50 GHz spacing to an optical channel scheme having 200 GHz spacing. In general, deinterleaver 200 includes deinterleaver 210 to convert from one set of 50 GHz spaced channels to two sets of 100 GHz spaced channels. Deinterleaver 200 also includes two deinterleavers (220 and 230) each of which convert one of the sets of 100 GHz spaced channels to two sets of 200 GHz spaced channels. Deinterleaver 200 allows devices designed for 200 GHz spaced channels to interact with devices or networks designed for 50 GHz spaced channels.

Optical fiber 205 carries a set of optical channels, i, having 50 GHz spacing. Deinterleaver 210 separates the set of optical channels into sets of even, 2(j+1), and odd, 2j+1, channels. The even channels are input to deinterleaver 230 and the odd channels are input deinterleaver 220. The even and the odd channels have 100 GHz spacing.

Deinterleavers 220 and 230 operate to further separate the set of optical channels. Conceptually, deinterleaver 220 and 230 operate on the respective 100 GHz spaced channels to separate the input channels into "even" and "odd" channels. The sets of channels output by deinterleavers 220 and 230 have 200 GHz spacing.

Deinterleaver 220 separates the odd channels into two sets of channels, odd-odd channels, 4k+1, output by optical fiber 240 and odd-even, 4k+2, channels output by optical fiber 250. Deinterleaver 230 separates the even channels into two sets of channels, the even-odd, 4k+3, channels output by optical fiber 260 and the even-even, 4(k+1), channels output by optical fiber 270.

The four sets of channels output by deinterleaver 200 are 200 GHz spaced channels. Thus, deinterleaver 200 can be used to interface one or more devices designed to operate on 200 GHz spaced channels with one or more devices or networks designed to operate on 50 GHz spaced channels. Other channel spacings can also be supported.

Figure 3:
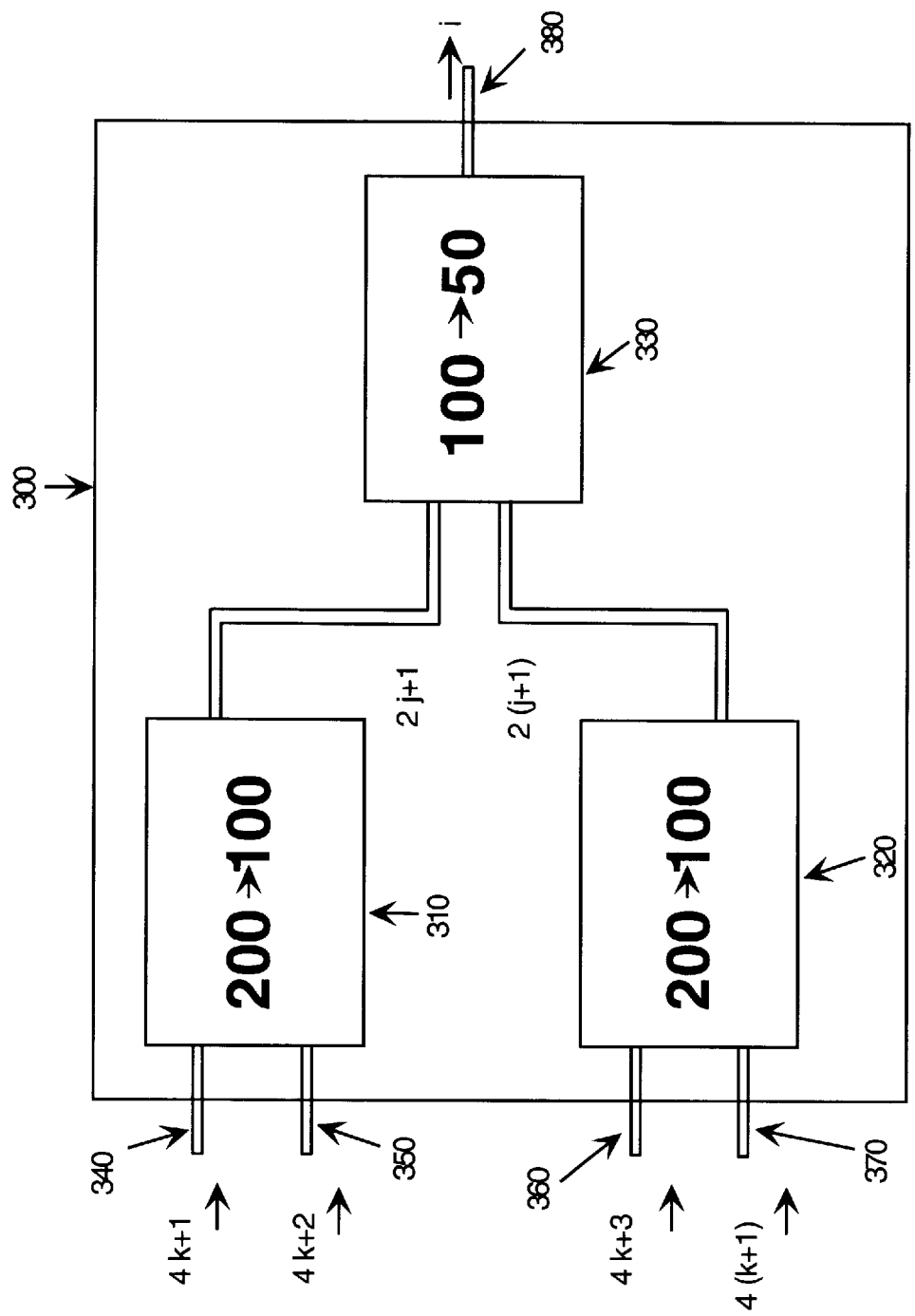
FIG. 3 is a block diagram of an optical interleaver for conversion from an optical channel scheme having 200 GHz spacing to an optical channel scheme having 50 GHz spacing.

FIG. 3 is a block diagram of an optical interleaver for conversion from an optical channel scheme having 200 GHz spacing to an optical channel scheme having 50 GHz spacing. In general, interleaver 300 includes interleaver 310 to convert from two sets of 200 GHz spaced channels to one set of 100 GHz spaced channels. Similarly, interleaver 320 converts from two sets of 200 GHz spaced channels to one set of 100 GHz channels. Interleaver 330 converts the two sets of 100 GHz spaced channels to one set of 50 GHz spaced channels. Interleaver 300 allows devices designed for 200 GHz spaced channels to interact with devices or networks designed for 50 GHz spaced channels.

The odd-odd, 4k+1, channels having 200 GHz spacing are input to interleaver 310 via optical fiber 340. The odd-even, 4k+2, channels having 200 GHz spacing are input to interleaver 310 via optical fiber 350. Interleaver 310 interleaves the odd-odd channels and the odd-even channels to generate a set of odd, 2j+1, channels having 100 GHz spacing.

The even-odd, 4k+3, channels having 200 GHz spacing are input to interleaver 320 via optical fiber 360. The even-even, 4(k+1), channels having 200 GHz spacing are input to interleaver 320 via optical fiber 370. Interleaver 320 interleaves the even-odd channels and the even-even channels to generate a set of even, 2(j+1), channels having 100 GHz spacing.

Interleaver 330 interleaves the even and odd channels to generate a set of channels, i, having 50 GHz spacing. Thus, interleaver 300 allows devices designed to operate on optical channels having 200 GHz spacing to interact with devices designed to operate on optical channels having 50 GHz spacing. Other channels spacings can also be supported.

Figure 4A:
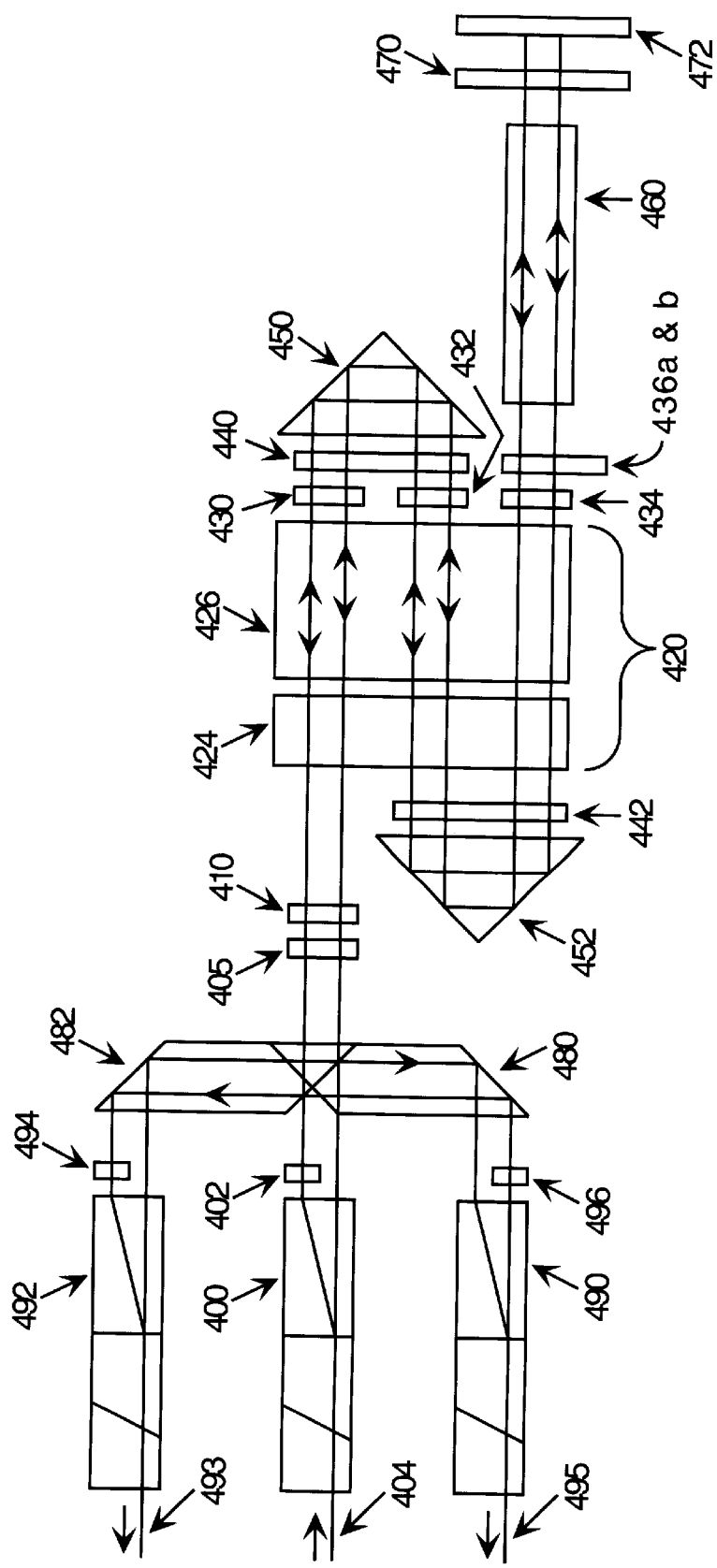
FIG. 4a illustrates a top view of one embodiment of a double-pass folded interleaver/deinterleaver.

FIG. 4a illustrates a top view of one embodiment of a double-pass folded interleaver/deinterleaver. The arrows of FIG. 4a correspond to the double-pass folded interleaver/deinterleaver operating as a deinterleaver. In other words an optical signal carrying information on multiple frequencies, for example, a wavelength division multiplexed (WDM) signal is received and separated into two optical signals, each of which include a predetermined subset of frequencies (e.g., even channels and odd channels) from the input optical signal.

An optical signal is received through port 400. In one embodiment, port 400 is a collimator assembly having a GRIN lens to collimate the light and a walk-off crystal to separate the horizontally polarized and the vertically polarized components of the optical signal. Other types of lenses can also be used, or pre-collimated light can be received. Port 400 receives an optical signal via an optical fiber and collimates the optical signal with the GRIN lens.

In one embodiment, port 400 also includes half wave plate 402 to rotate either the vertically polarized component or the horizontally polarized component of the optical signal. In one embodiment, half wave plate 402 has an azimuth angle of 45° with respect to an optical signal received by port 400 from optical fiber 404. In one embodiment, the walk-off crystal of port 400 offsets the vertically polarized component of the optical signal and half wave plate 402 causes the vertically polarized component to be horizontally polarized such that both components are horizontally polarized when the components pass through polarizer 405.

The collimated optical signal is directed to polarizer 405 through a small opening between walk-off crystal 480 and walk-off crystal 482. In one embodiment, polarizer 405 provides polarization in the range of 0° to 15° (e.g., 2.6°) for optical signals passing from port 400 to birefringent assembly 420, however, other polarizations can be provided based on, for example, the azimuth angles of one or more half wave plates.

The polarized optical signal is then passed through half wave plate 410. In one embodiment, half wave plate 410 is oriented with a first predetermined azimuth angle. In one embodiment, the first azimuth angle is in the range of 0° to −15° (e.g., −6.5°) for optical signals passing from port 400 to birefringent assembly 420; however, the azimuth angle can be different with appropriate changes to the azimuth angles of one or more other half wave plates and/or polarizer 405. Half wave plate 410 introduces a relative phase difference of 180° between the ordinary and extraordinary components of the optical signal.

After passing through half wave plate 410, the optical signal is directed to birefringent assembly 420. In one embodiment, birefringent assembly 420 is composed of crystals 424 and 426 that are selected to provide improved thermal stability over a range of operating temperatures as compared to a single birefringent crystal. In one embodiment, crystal 424 is a $TiO_2$ crystal having a thickness of 2 mm, and crystal 426 is a $YVO_4$ crystal having a thickness of 9.5 mm; however, other sizes can also be used. Other birefringent assemblies can also be used, for example, a single crystal can be used if temperature stability is not important, or other two-crystal birefringent assemblies can be used.

After passing through birefringent assembly 420, the optical signal passes through half wave plate 430. In one embodiment, half wave plate 430 is oriented with the an azimuth angle in the range of 0° to −15° (e.g., −6.5°) for optical signals passing from birefringent assembly 420 to reflective element 450. Other azimuth angles for half wave plate 430 or for both half wave plate 430 and half wave plate 410 can be used for different filtering characteristics or physical configurations.

After passing through half wave plate 430, the optical signal is reflected by reflective element 450. In one embodiment, reflective element 450 is a 90° reflecting crystal; however, other reflective elements can be used based on, for example, the physical layout of the interleaver/deinterleaver. In one embodiment, the face(s) through which the optical signal is received and/or reflected has low-order compensator 440 component to compensate for phase shift in the respective crystals. If the reflective element does not cause a phase shift, low-order compensator 440 can be omitted.

The optical signal reflected by reflective element 450 is directed through half wave plate 432. Half wave plate 432 introduces a relative phase difference of 180° between the ordinary and extraordinary waves of the optical signal. In one embodiment, half wave plate 432 is oriented with a second predetermined azimuth angle. In one embodiment, the second azimuth angle is in the range of 15° to 30° (e.g., 22.5°) for optical signals passing from reflective element 450 to birefringent assembly 420; however, the azimuth angle can be different with appropriate changes to the angles of one or more other half wave plates.

The optical signal passes through birefringent assembly 420 to reflective element 452. The optical signal is reflected by reflective element 452 back through birefringent assembly 420. In one embodiment, reflective element 452 is a 90° reflecting crystal; however, other reflective elements can be used. In one embodiment, the face(s) through which the optical signal is received and/or reflected has low-order compensator 442 to compensate for phase shift in the respective crystals. If the reflective element does not cause a phase shift, low-order compensator 442 can be omitted.

After passing through birefringent assembly 420 as reflected by reflective element 452, the optical signal passes through half wave plate 434. In one embodiment, half wave plate 434 has an azimuth angle is in the range of 15° to 30° (e.g., 22.5°) for optical signals passing from to birefringent assembly 420 to walk-off crystal 460. Other azimuth angles for half wave plate 434 can be used for different filtering characteristics or physical configurations.

When the optical signal is traveling from birefringent assembly 420, the optical signal passes between half wave plates 436a and 436b. One configuration for half wave plates 436a and 436b is described in greater detail below with respect to FIG. 5. In one embodiment, the azimuth angle of half wave plates 436a and 436b are in the range of 40° to 50°

(e.g., 45°) for optical signals passing from walk-off crystal 460 to birefringent assembly 420; however, the azimuth angle can be different with appropriate changes to the azimuth angles of one or more other half wave plates and/or polarizer 405.

The optical signals pass through half wave plate 470 and are reflected by quarter wave mirror 472. In one embodiment, the azimuth angle of half wave plate 470 is in the range of 40° to 50° (e.g., 45°) for optical signals passing from walk-off crystal 460 to quarter wave mirror 472; however, the azimuth angle can be different with appropriate changes to the azimuth angles of one or more other half wave plates and/or polarizer 405. The effect of walk-off crystal 460 is described in greater detail below with respect to FIG. 5. Quarter wave mirror 472 reflects the optical signals back through walk off crystal 460. Quarter wave mirror 472 also introduces a relative phase shift of 90° between the ordinary and extraordinary components of the optical signal.

After passing through half wave plates 436a and 436b, the optical signals pass through birefringent assembly 420 and are reflected by reflective element 452 through birefringent assembly 420 through half wave plate 432 to reflective element 450. Reflective element 450 reflects the signals through half wave plate 430, birefringent assembly 420, half wave plate 410 and polarizer 405 to walk-off crystals 480 and 482. Walk-off crystals 480 and 482 direct the optical signals to ports 490 and 492, respectively.

Port 490 includes half wave plate 496 and port 492 includes half wave plate 494. In one embodiment, both half wave plate 494 and half wave plate 496 have azimuth angles of 45° with respect to optical signals received from walk-off crystal 482 and walk-off crystal 480, respectively. Half wave plate 494 and 496 rotate the optical components received such that ports 492 and 490, respectively, each receive a vertically polarized component and a horizontally polarized component, which are combined and directed to optical fibers 493 and 495, respectively.

To operate as an interleaver, two sets of optical signals are input to ports 490 and 492. The two sets of optical signals are combined in a manner that is the reverse of the deinterleaver function described above. The combined (interleaved) optical signal is output through port 400. Thus, the apparatus illustrated in FIG. 4 can operate as an interleaver or as a deinterleaver.

In one embodiment, the interleaver/deinterleaver of FIG. 4a is angle tuned to compensate for manufacturing tolerances. In one embodiment, angle tuning is accomplished by rotating birefringent assembly 420 after the interleaver/deinterleaver has been assembled so that the signals (e.g., ITU channels) interleaved or deinterleaved match the desired characteristics. Birefringent assembly 420 is rotated to increase the optical path length of the signals passing through birefringent assembly 420. When the desired optical path length is provided, birefringent assembly 420 is maintained in the desired position through, for example, use of epoxy or soldering techniques.

Figure 4B:
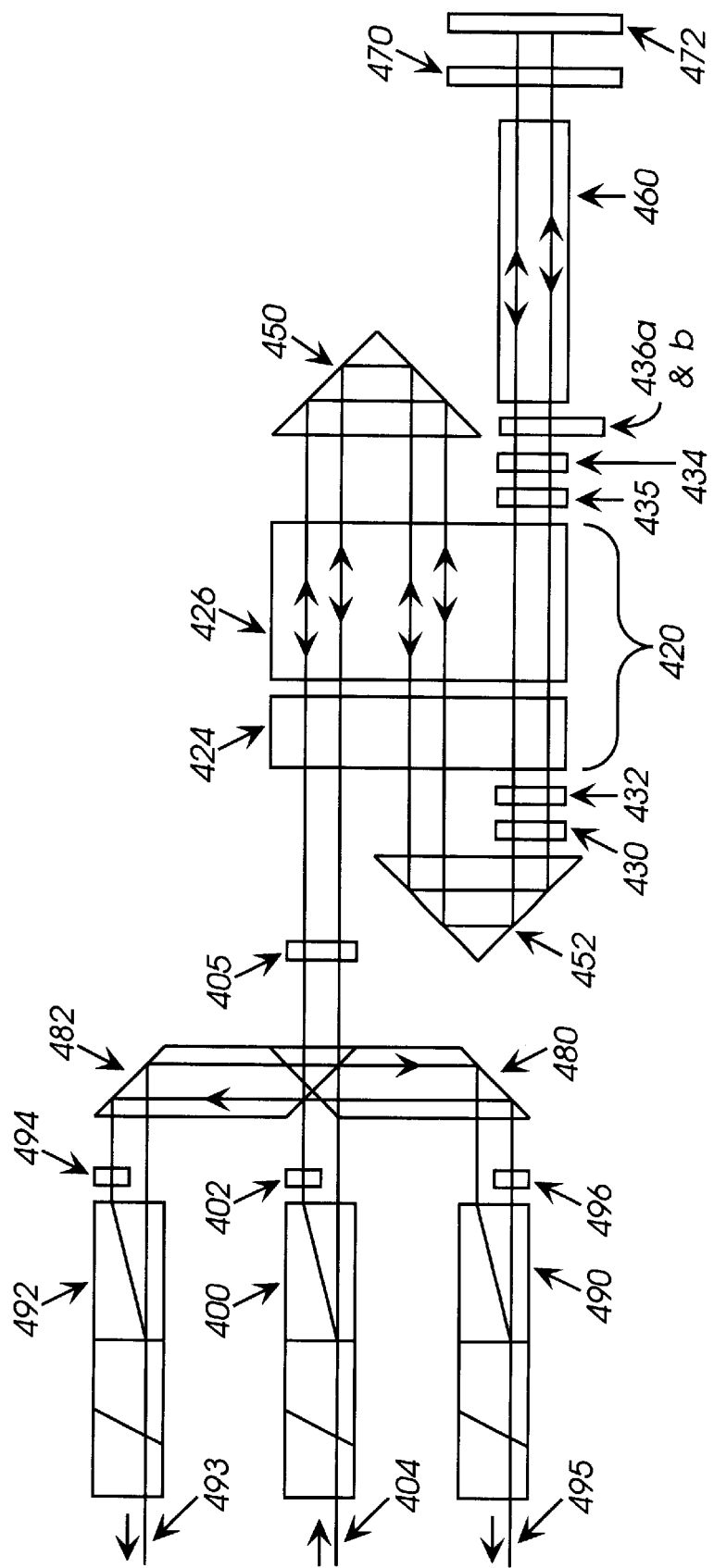
FIG. 4b illustrates a top view of one embodiment of a double-pass folded interleaver/deinterleaver.

FIG. 4b illustrates a top view of one embodiment of a double-pass folded interleaver/deinterleaver. The interleaver/deinterleaver of FIG. 4b includes the same components (e.g., reflective elements, half wave plates, birefringent assembly) as the interleaver/deinterleaver of FIG. 4a; however, the components are arranged in different physical positions for the interleaver/deinterleaver of FIG. 4b compared to the interleaver/deinterleaver of FIG. 4a.

In one embodiment, the interleaver/deinterleaver of FIG. 4b does not include the low-order compensators of the interleaver/deinterleaver of FIG. 4a. The optical compensation of the low-order compensators can be provided by angle tuning birefringent assembly 420. The increase optical path length through material of the interleaver/deinterleaver can be provided by birefringent assembly 420 rather than by the low-order compensators. In an alternate embodiment, the interleaver/deinterleaver of FIG. 4b can include low-order compensators as described above with respect to FIG. 4a.

Figure 4C:
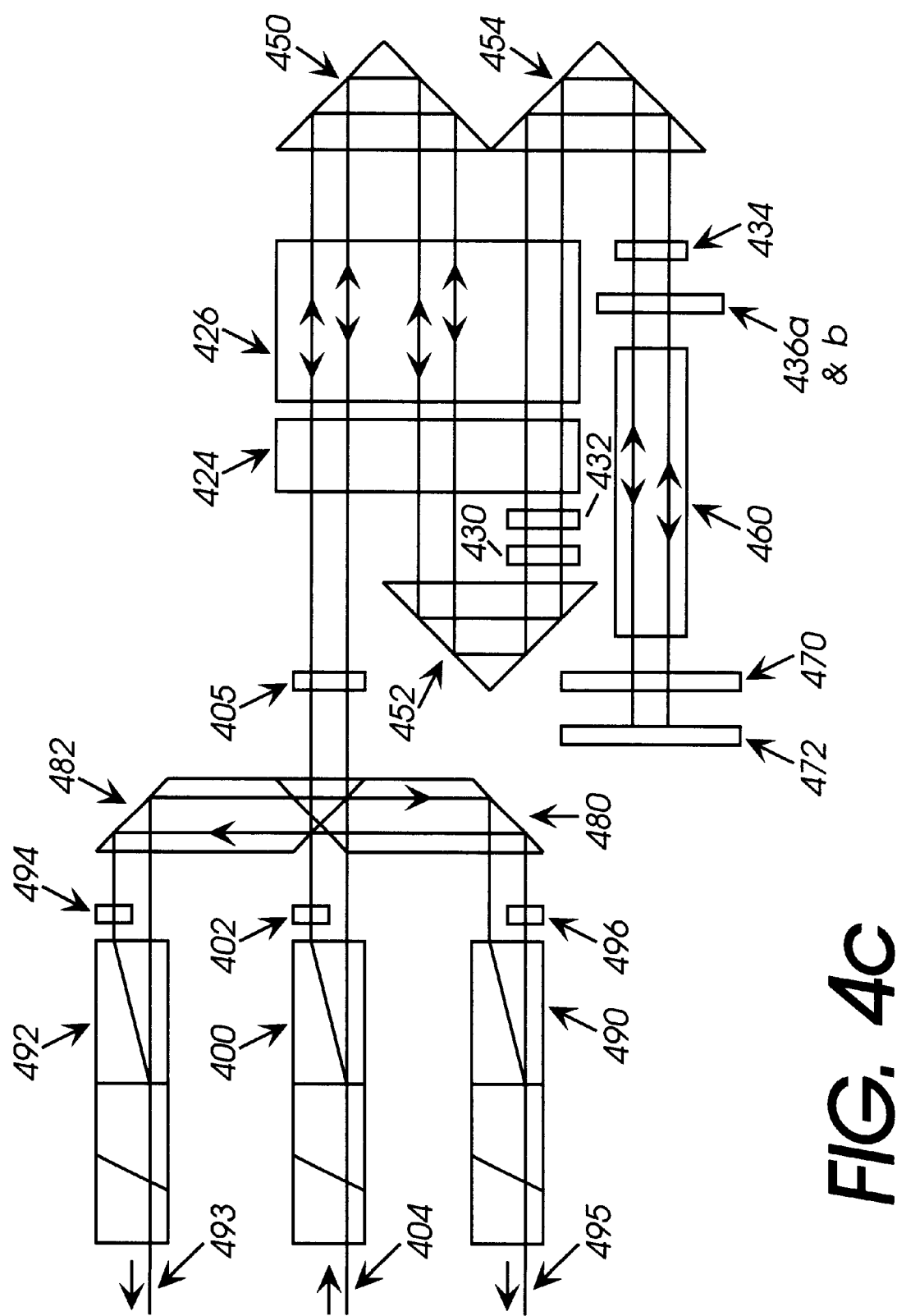
FIG. 4c illustrates a top view of one embodiment of a double-pass folded interleaver/deinterleaver.

FIG. 4c illustrates a top view of one embodiment of a double-pass folded interleaver/deinterleaver. The interleaver/deinterleaver of FIG. 4c includes the same components (e.g., reflective elements, half wave plates, birefringent assembly) as the interleaver/deinterleaver of FIGS. 4a and 4b with the addition of reflective element 454. The components are arranged in different physical positions for the interleaver/deinterleaver of FIG. 4c compared to the interleaver/deinterleaver of FIGS. 4a and 4b.

In one embodiment, the interleaver/deinterleaver of FIG. 4c does not include the low-order compensators of the interleaver/deinterleaver of FIG. 4a. The optical compensation of the low-order compensators can be provided by angle tuning birefringent assembly 420. The increase optical path length through material of the interleaver/deinterleaver can be provided by birefringent assembly 420 rather than by the low-order compensators. In an alternate embodiment, the interleaver/deinterleaver of FIG. 4b can include low-order compensators as described above with respect to FIG. 4a.

Figure 5:
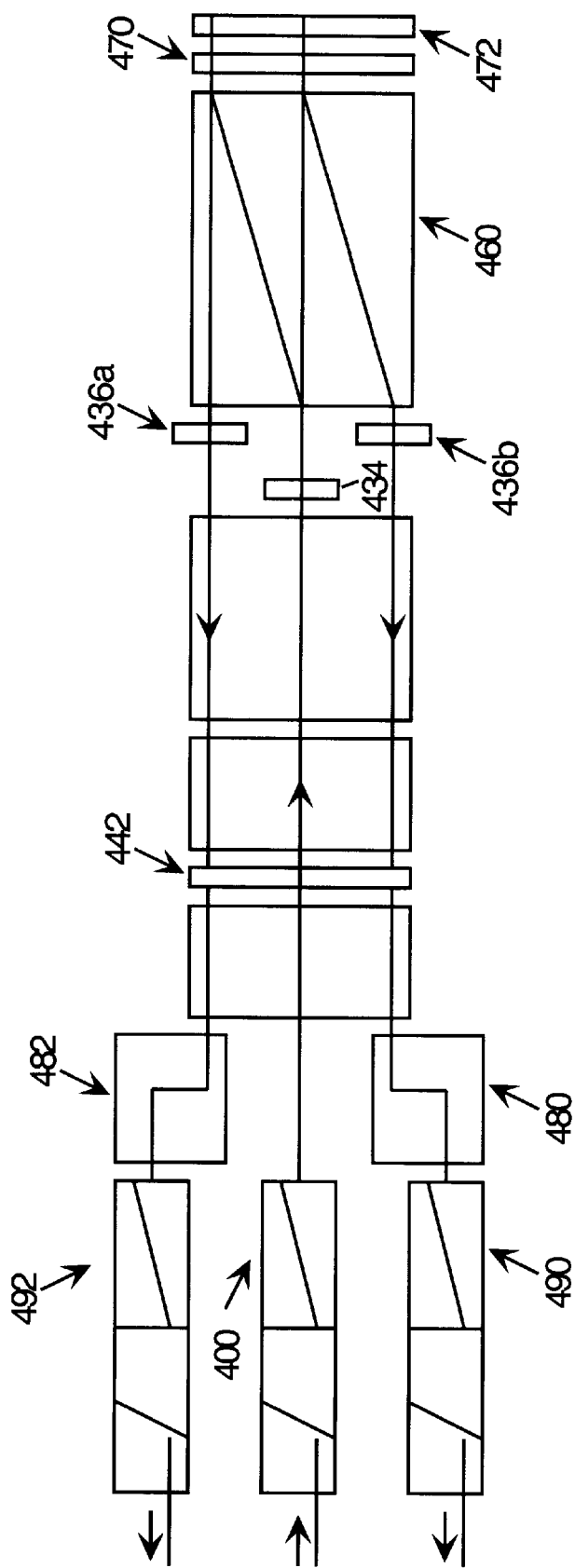
FIG. 5 illustrates a side view of one embodiment of the double-pass folded interleaver/deinterleaver of FIG. 4.

FIG. 5 illustrates a side view of one embodiment of the double-pass folded interleaver/deinterleaver of FIGS. 4a and 4b. The side view of FIG. 5 is from the side of port 490 and walk-off crystal 460.

When operating as a deinterleaver, the optical signal input to the interleaver/deinterleaver travels to half wave plate 434 and walk-off crystal 460 as described above with respect to FIGS. 4a and 4b. Walk-off crystal 460 offsets the optical signals such that when the optical signals are reflected, one set of optical signals passes through half plate 436a and the second set of optical signals passes through half wave plate 436b. The polarization states of the optical signals is described in greater detail below.

The two optical signals are reflected back to walk-off crystal 480 and walk-off crystal 482 as described above. Walk-off crystal 480 and walk-off crystal 482 shift the optical signals to be aligned with ports 490 and 492. The signals are output through ports 490 and 492.

To operate as an interleaver, two sets of optical signals are input to ports 490 and 492. The two sets of optical signals are combined in a manner that is the reverse of the deinterleaver function described above. The combined (interleaved) optical signal is output through port 400. Thus, the apparatus illustrated in FIG. 4 can operate as an interleaver or as a deinterleaver.

Figure 6:
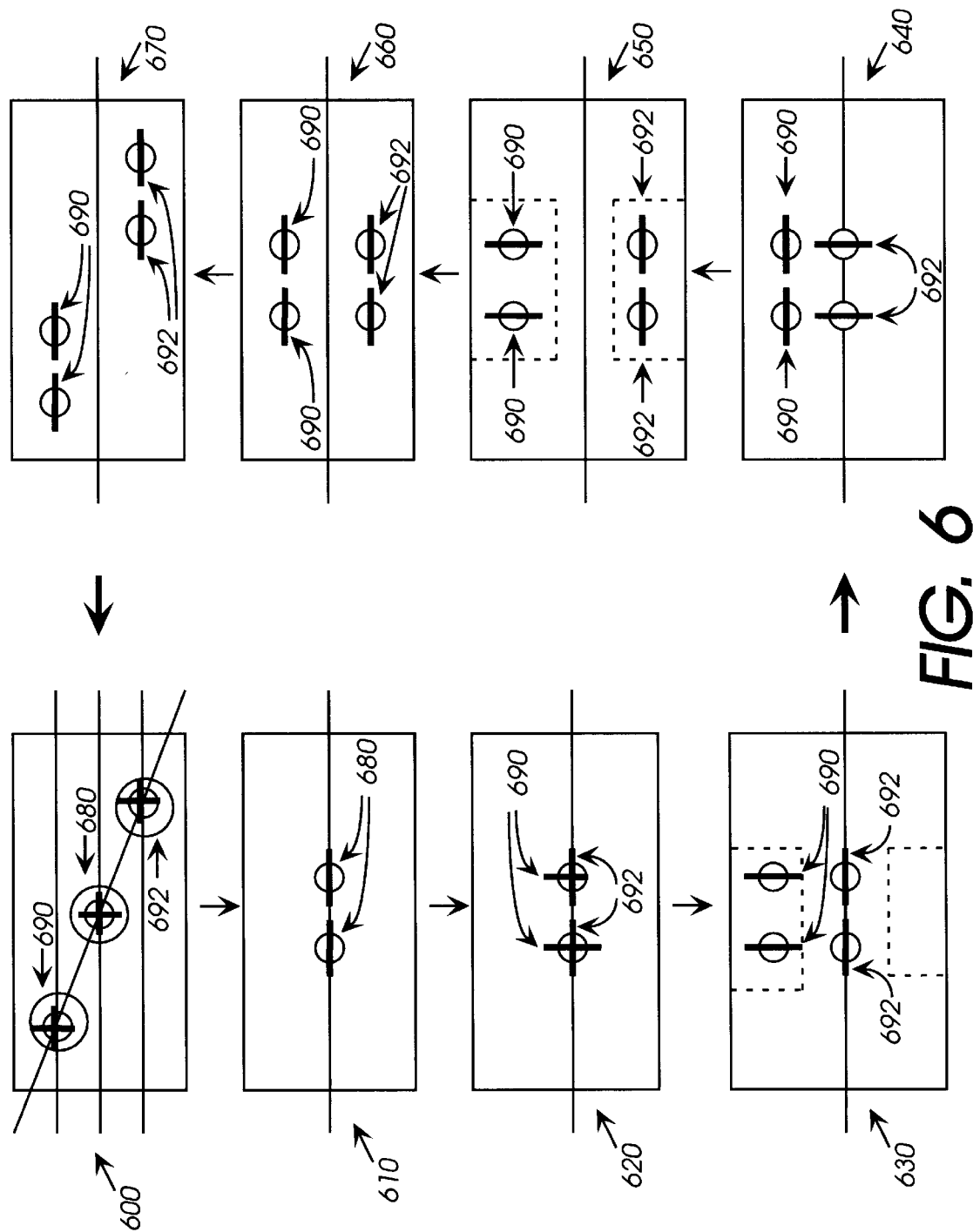
FIG. 6 illustrates a cross-sectional view of polarization states of a double-pass optical interleaver/deinteleaver as illustrated in FIGS. 4 and 5.

FIG. 6 illustrates a cross-sectional view of polarization states of a double-pass optical interleaver/deinterleaver as illustrated in FIGS. 4a and 5. With respect to FIG. 6, a forward pass cross-sectional view refers to an illustration of the polarization states of one or more optical signals as the signal(s) pass from the input port(s) to quarter wave mirror 472. A backward pass cross-sectional view refers to an illustration of the polarization states of one or more signals as the signal(s) pass from quarter wave mirror 472 to the output port(s).

State 600 represents the input/output ports 400, 490 and 492 of FIGS. 4 and 5 having input/output signals 680, 690 and 692, respectively. The input and output ports receive and send, respectively, optical signals having both horizontal and vertical components. The arrows of FIG. 6 indicate the polarization state sequence for a deinterleaver.

State 610 is the forward pass cross-sectional view of input optical signal 680 between walk-off crystals 480 and 482 and polarizer 405. In one embodiment, input port 400 includes a walk-off crystal to separate the input signal into two sub-beams and a half wave plate to rotate one of the sub-beams 90°.

State 620 is the forward pass cross-sectional view of output optical signals 690 and 692 between 420 and 434. In state 620 output optical signal 690 has two vertically polarized components and output optical signal 692 has two horizontally polarized components.

State 630 is the forward pass cross-sectional view of the output optical signal 690 and 692 between walk-off crystal 460 and half wave plate 470. In state 630, the vertical components of output optical signal 690 have been shifted by walk off crystal 460. The dashed lines shown in state 630 represent the position of half wave plates 436*a* and 436*b*.

State 640 is the backward pass cross-sectional view of output optical signals 690 and 692 between 470 and 460. In state 640 both components of both output optical signals have been rotated 90° by quarter wave mirror 472.

State 650 is the backward pass cross-sectional view of output optical signals 690 and 692 between 434 and 420. Both components of output optical signal 692 have been shifted by walk-off crystal 460 and both components of both output optical signals 690 and 692 have been rotated by half wave plates 436*a* and 436*b*.

State 660 is the backward pass cross-sectional view of output optical signals 690 and 692 between polarizer 405 and walk-off crystals 480 and 482. Both output optical signals 690 and 692 have two horizontally polarized components that are aligned with walk-off crystals 480 and 482 respectively.

State 670 is the backward pass cross-sectional view of output optical signals 690 and 692 between walk-off crystals 480 and 482 and ports 492 and 490. Walk-off crystals 480 and 482 provide offset to align output optical signals 680 and 682 with ports 490 and 492, respectively.

Figure 7A:
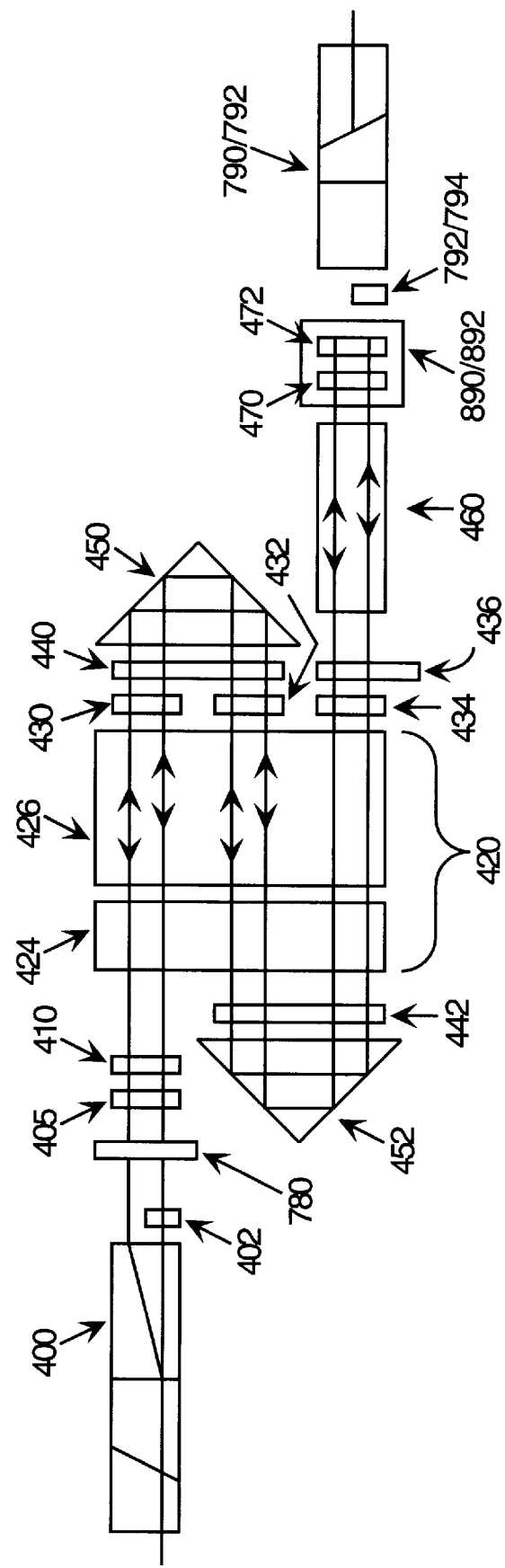
FIG. 7a illustrates a top view of a multi-pass optical interleaver/deinterleaver.

FIG. 7*a* illustrates a top view of one embodiment of a multi-pass optical interleaver/deinterleaver. In the multi-pass optical interleaver/deinterleaver of FIG. 7*a*, the optical signals make the first pass through the interleaver/deinterleaver to quarter wave mirror 472 in the same manner as with the interleaver/deinterleaver of FIG. 4.

Quarter wave mirror 472 reflects the signals back thorough birefringent assembly 420 in the same manner as the interleaver/deinterleaver of FIG. 4 except that rather than being received and offset by walk off crystals 480 and 482, the optical signals pass through half wave plate 410 and polarizer 410 reflected by quarter wave mirror 782. Quarter wave mirror 782, and half wave plates 782 and 782 rotate the optical signals. The optical signals are reflected back through birefringent assembly 420 in a similar manner as described above through half wave plate 734 to ports 790 and 792.

Ports 790/792 (port 792 is behind port 790 and therefore obscured in the illustration of FIG. 7*a*) include half wave plates 796/794, respectively. In one embodiment, both half wave plate 796 and half wave plate 794 have azimuth angles of 45° with respect to optical signals received from walk-off crystal 460. Half wave plates 794 and 796 rotate the optical components received such that ports 792 and 790, respectively, each receive a vertically polarized component and a horizontally polarized component, which are combined and directed to optical fibers.

To operate as an interleaver, two sets of optical signals are input to ports 790 and 792. The two sets of optical signals are combined in a manner that is the reverse of the deinterleaver function described above. The combined (interleaved) optical signal is output through port 400. Thus, the apparatus illustrated in FIG. 7*a* can operate as an interleaver or as a deinterleaver.

In one embodiment, the interleaver/deinterleaver of FIG. 7*a* is angle tuned to compensate for manufacturing tolerances. In one embodiment, angle tuning is accomplished by rotating birefringent assembly 420 after the interleaver/deinterleaver has been assembled so that the signals (e.g., ITU channels) interleaved or deinterleaved match the desired characteristics. Birefringent assembly 420 is rotated to increase the optical path length of the signals passing through birefringent assembly 420. When the desired optical path length is provided, birefringent assembly 420 is maintained in the desired position through, for example, use of epoxy or soldering techniques.

Figure 7B:
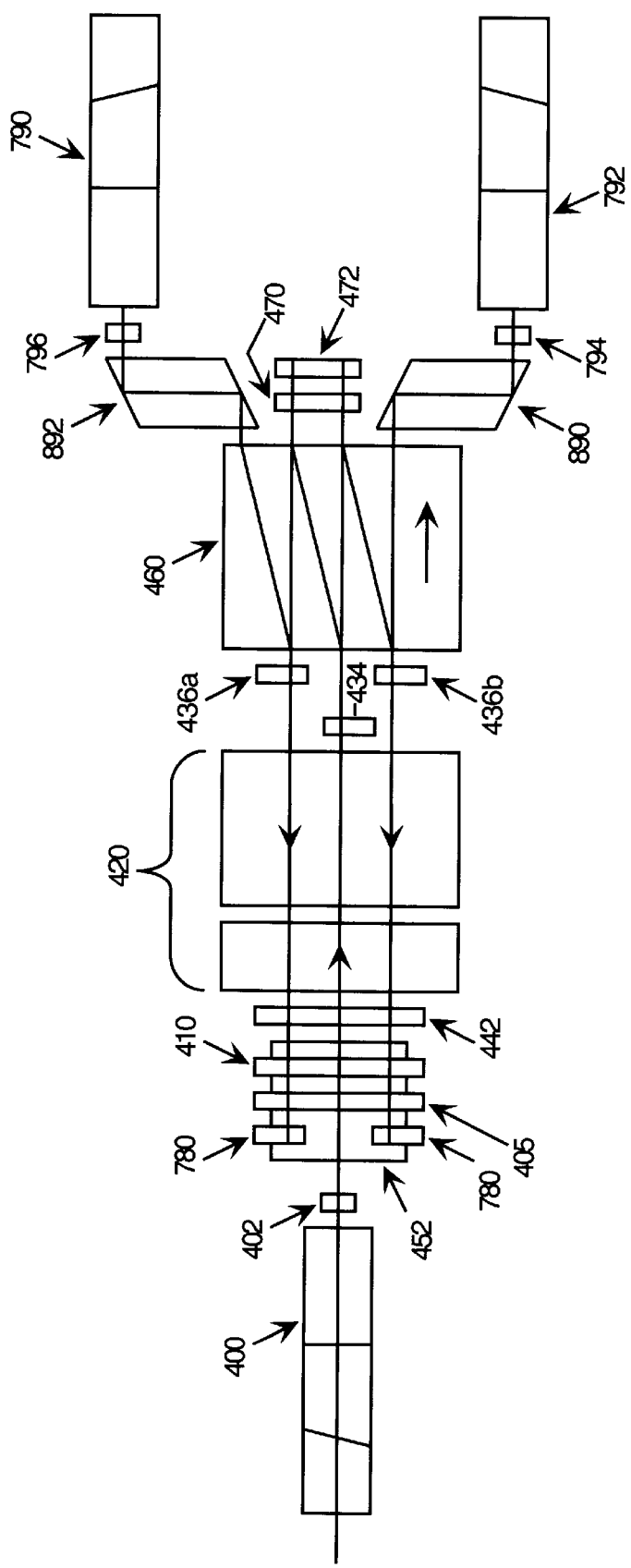

FIG. 7*b* illustrates a side view of the multi-pass optical interleaver/deinterleaver of FIG. 7*a*. As mentioned above, the optical signals make the first pass through the interleaver/deinterleaver to quarter wave mirror 472 in the same manner as with the interleaver/deinterleaver of FIG. 4.

Walk-off crystals 460 offsets the optical signals and quarter wave mirrors 780 reflect the optical signals back through birefringent assembly 420 as described above. The optical signals are reflected back through birefringent assembly 420 in a similar manner as described above to walk-off crystals 890 an 892, which offset optical signals to ports 790 and 792, respectively.

Figure 8A:
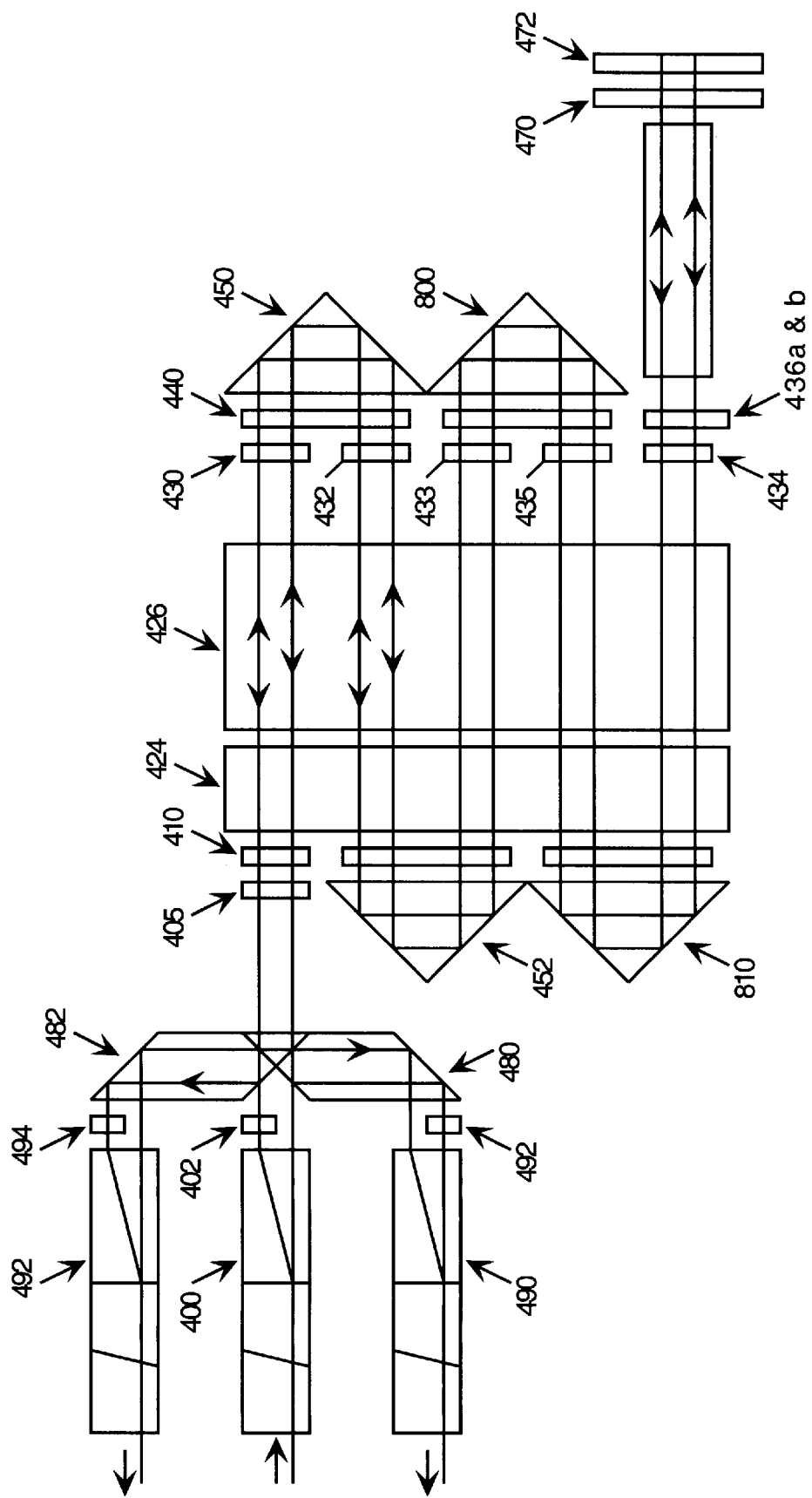
FIG. 8a illustrates a top view of one embodiment of a double-pass folded interleaver/deinterleaver.

FIG. 8*a* illustrates a top view of one embodiment of a double-pass folded interleaver/deinterleaver. The interleaver/deinterleaver of FIG. 8*a* includes the same components (e.g., reflective elements, half wave plates, birefringent assembly) as the interleaver/deinterleaver of FIG. 4*a* with the addition of reflective elements 800 and 810 and half wave plates 433 and 435. In one embodiment, half wave plate 433 has an azimuth angle of 22.5° for optical signals passing form reflective element 450 to birefringent assembly 420 and half wave plate 435 has an azimuth angle of 22.5° for optical signals passing from reflective element 800 to birefringent assembly 420.

In one embodiment, the components are arranged in different physical positions for the interleaver/deinterleaver of FIG. 8*a* compared to the interleaver/deinterleaver of FIG. 4*a* to provide similar functionality. The interleaver/deinterleaver of FIG. 8*a* provides improved filtering as compared to FIG. 4*a* because optical signals are passed through birefringent assembly 420 a greater number of times.

In one embodiment, the interleaver/deinterleaver of FIG. 8*a* does not include the low-order compensators of the interleaver/deinterleaver of FIG. 4*a*. The optical compensation of the low-order compensators can be provided by angle tuning birefringent assembly 420. The increase optical path length through material of the interleaver/deinterleaver can be provided by birefringent assembly 420 rather than by the low-order compensators. In an alternate embodiment, the interleaver/deinterleaver of FIG. 8*a* can include low-order compensators as described above with respect to FIG. 4*a*.

Figure 8B:
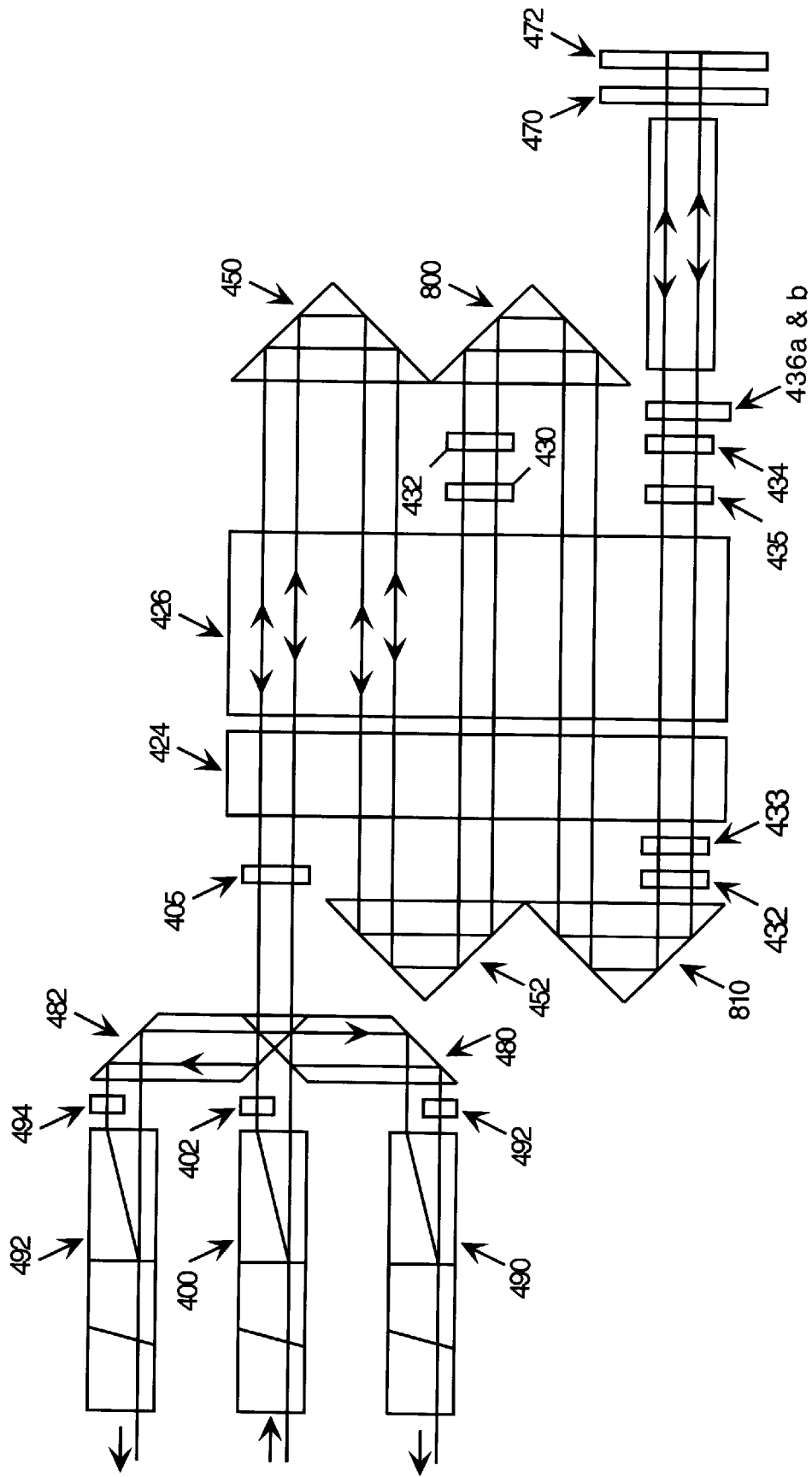
FIG. 8b illustrates a top view of one embodiment of a double-pass folded interleaver/deinterleaver.

FIG. 8*b* illustrates a top view of one embodiment of a double-pass folded interleaver/deinterleaver. The interleaver/deinterleaver of FIG. 8*b* includes the same components (e.g., reflective elements, half wave plates, birefringent assembly) as the interleaver/deinterleaver of FIG. 8a; however, the components are arranged in different physical positions for the interleaver/deinterleaver of FIG. 8b compared to the interleaver/deinterleaver of FIG. 8a.

In one embodiment, the interleaver/deinterleaver of FIG. 8b does not include the low-order compensators. The optical compensation of the low-order compensators can be provided by angle tuning birefringent assembly 420. The increase optical path length through material of the interleaver/deinterleaver can be provided by birefringent assembly 420 rather than by the low-order compensators. In an alternate embodiment, the interleaver/deinterleaver of FIG. 8b can include low-order compensators as described above with respect to FIG. 4a.

Figure 8C:
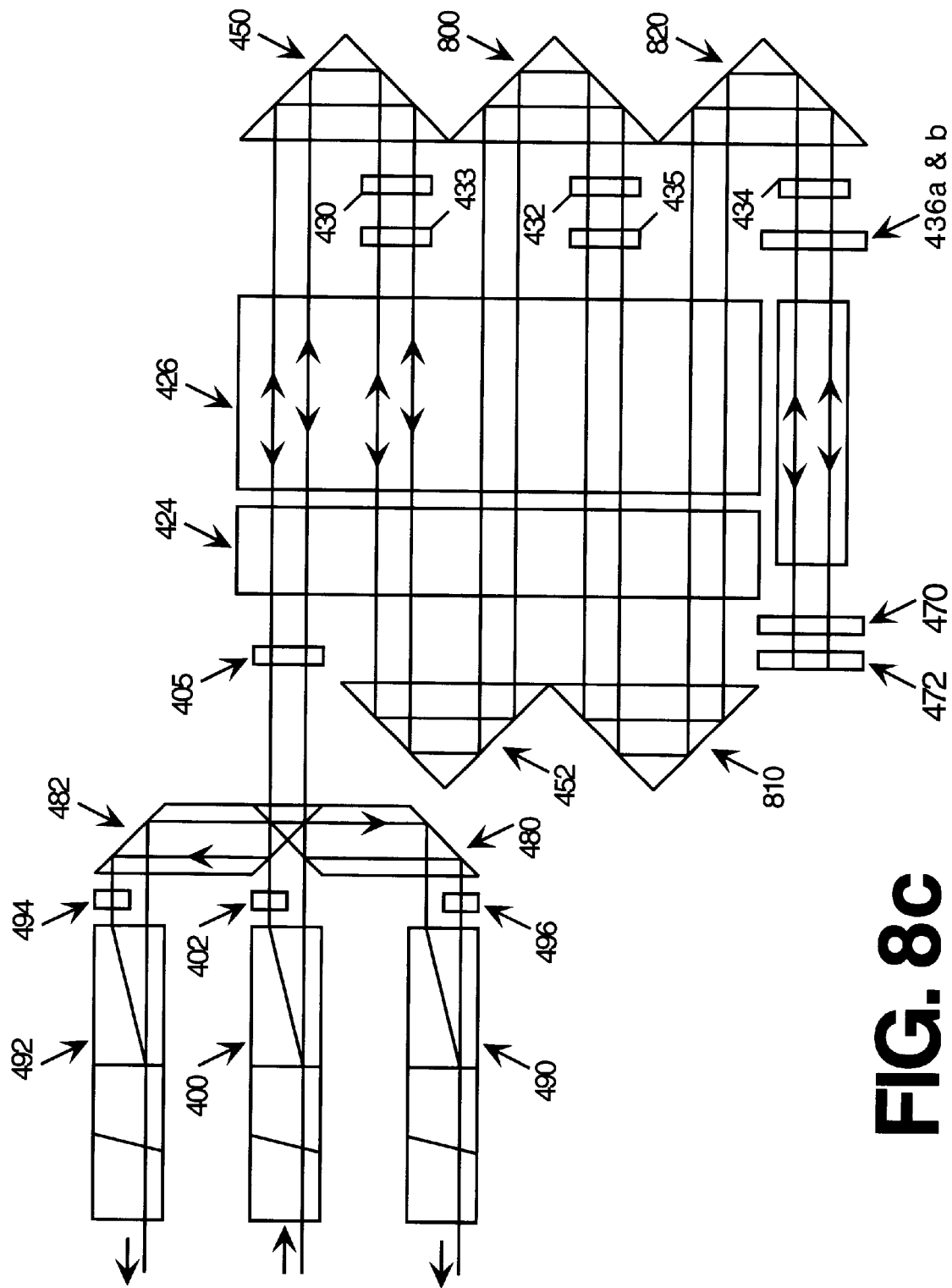
FIG. 8c illustrates a top view of one embodiment of a double-pass folded interleaver/deinterleaver.

FIG. 8c illustrates a top view of one embodiment of a double-pass folded interleaver/deinterleaver. The interleaver/deinterleaver of FIG. 8c includes the same components (e.g., reflective elements, half wave plates, birefringent assembly) as the interleaver/deinterleaver of FIG. 8a with the addition of reflective element 820. In one embodiment, the components are arranged in different physical positions for the interleaver/deinterleaver of FIG. 8c compared to the interleaver/deinterleaver of FIG. 4a to provide similar functionality.

In one embodiment, the interleaver/deinterleaver of FIG. 8c does not include the low-order compensators. The optical compensation of the low-order compensators can be provided by angle tuning birefringent assembly 420. The increase optical path length through material of the interleaver/deinterleaver can be provided by birefringent assembly 420 rather than by the low-order compensators. In an alternate embodiment, the interleaver/deinterleaver of FIG. 8c can include low-order compensators as described above with respect to FIG. 4a.

Figure 9:
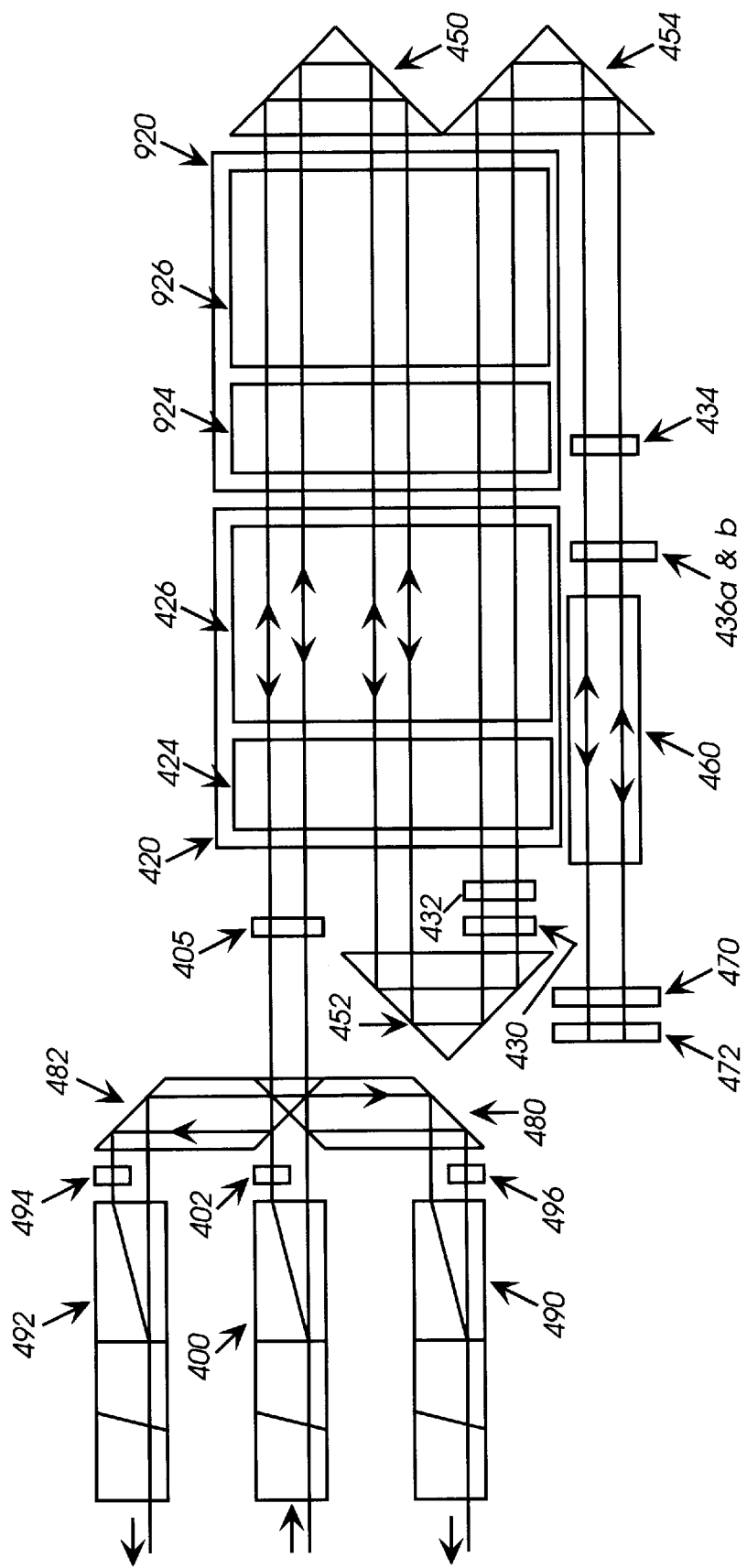
FIG. 9 illustrates one embodiment of an optical interleaver/deinterleaver having two birefringent assemblies.

FIG. 9 illustrates one embodiment of an optical interleaver/deinterleaver having two birefringent assemblies. The interleaver/deinterleaver of FIG. 9 includes the same components (e.g., reflective elements, half wave plates, birefringent assembly) as the interleaver/deinterleaver of FIG. 4a with the addition of birefringent assembly 920, which includes, in one embodiment, crystals 924 and 926. The interleaver/de-interleaver of FIG. 9 provides improved filtering as compared to FIG. 4a because optical signals are passed through birefringent assembly 420 and through birefringent assembly 920.

In one embodiment, the interleaver/deinterleaver of FIG. 9 does not include the low-order compensators of the interleaver/deinterleaver of FIG. 4a. The optical compensation of the low-order compensators can be provided by angle tuning birefringent assembly 420 and/or birefringent assembly 920. The increase optical path length through material of the interleaver/deinterleaver can be provided by birefringent assembly 420 and/or birefringent assembly 920 rather than by the low-order compensators. In an alternate embodiment, the interleaver/deinterleaver of FIG. 9 can include low-order compensators as described above with respect to FIG. 4a.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. An interleaver/deinterleaver apparatus comprising:
    a first port for inputting or outputting a first polarized optical signal comprising a second signal with a first subset of channels, and a third signal with a second subset of channels;
    a second port for outputting or inputting the second signal;
    a third port for outputting or inputting the third signal;
    a birefringent assembly optically coupled to the first, second and third ports;
    a plurality of reflective elements positioned to reflect the first optical signal a plurality of times through the birefringent assembly along a first optical path or for reflecting the second and third signals a plurality of times through the birefringent assembly along second and third paths, respectively, thereby providing the first subset of channels with a different polarization than the second subset of channels;
    a first beam splitter/combiner positioned to receive the optical signals from the birefringent assembly, for separating the first subset of channels from the second subset of channels or for combining the first subset of channels with the second subset of channels; and
    a mirror positioned to reflect the first and second subsets of channels separately back to the birefringent assembly and the plurality of reflective elements for a second pass through the birefringent assembly along the second and third optical paths, respectively, that are parallel to the first optical path or to reflect the first and second subsets of channels together back to the birefringent assembly and the plurality of reflective elements for another pass through the birefringent assembly along the first optical path;
    wherein the first optical signal received via the first port is separated into the first subset and the second subset and directed to the second port and the third port, respectively, or wherein optical signals received via the second port and the third port are combined and directed to the first port.

2. The apparatus of claim 1 further comprising first polarization rotating means positioned in the first, second and third paths, the first polarization rotating means being oriented with azimuth angles such that the first optical signal received via the first port is separated into the first subset of optical channels and the second subset of optical channels and output via the second port and the third port, respectively, or such that the first subset of optical channels received via the second port and the second subset of optical channels received via the third port are combined into a superset of optical channels and output via the first port.

3. The apparatus of claim 1 wherein the plurality of reflective elements further comprises a low-order compensator component to compensate for phase shift in the reflective element.

4. The apparatus of claim 1 wherein the optical signal received via the first port comprises a wavelength division multiplexed (WDM) optical signal.

5. The apparatus of claim 1 wherein the birefringent assembly comprises a single birefringent crystal.

6. The apparatus of claim 1 wherein the birefringent assembly comprises a multiple birefringent crystals.

7. The apparatus of claim 6 wherein the birefringent assembly comprises a $TiO_2$ crystal and a $YVO_4$ crystal.

8. The apparatus of claim 1 wherein the first subset of channels odd International Telecommunications Union (ITU) channels and the second subset of channels comprises even ITU channels.

9. The apparatus of claim 1 comprising:
a lens at each port for collimating incoming signals and/or focusing outgoing signals;
second beam splitting/combining means at each port for separating incoming signals into pairs of polarized sub-beams and/or for combining outgoing pairs or polarized sub-beams; and
sub-beam rotating means for rotating the polarization of at least one of each pair of incoming sub-beams, whereby both sub-beams have the same polarization, and/or for rotating the polarization of at least one of each pair of outgoing sub-beams, whereby the sub-beams in each pair of outgoing sub-beams have orthogonal polarizations.

10. The apparatus of claim 1, wherein the plurality of reflective elements comprises:
a first reflective element, which receives either the first optical signal or the second and third optical signals from the birefringent assembly and directs them through the birefringent assembly a second time; and
a second reflective element, which receives either the first optical signal or the second and third optical signals from the first reflective element and directs them through the birefringent assembly a third time to the first beam splitter.

11. The apparatus of claim 10 further comprising a third reflective element and a fourth reflective element, which receives either the first optical signal or the second and third optical signals from the second reflective element, for directing them through the birefringent assembly a fourth and a fifth time, respectively, to the first beam splitter.

12. The apparatus of claim 10, wherein the reflecting means comprises mirrors positioned in the second and third optical paths for receiving the second and third optical signals after a first pass through the birefringent assembly and directing the second and third optical signals through the birefringent assembly for a second pass to the second reflecting means or for receiving the second and third optical signals after a second pass through the birefringent assembly and directing the second and third optical signals through the birefringent assembly for a third pass to the second and third ports.

13. The apparatus of claim 1, further comprising reflecting means for reflecting the first and second subsets of channels back through the birefringent assembly and the plurality of reflective elements for a third pass.

14. The apparatus of claim 1 further comprising a switching mechanism to switch the first and second subsets of channels between the second port and the third port.

15. The apparatus of claim 1 wherein each reflective element comprises a 90° reflective crystal.

16. An apparatus comprising:
a birefringent assembly;
first reflecting means for reflecting an optical signal such that the optical signal makes multiple passes through the birefringent assembly following a predetermined path a first time;
first polarization rotator for reorienting the polarization of the optical signal after at least one of the passes through the birefringent assembly, whereby after making the multiple passes through the birefringent assembly for the first time only a first subset of optical channels in the optical signal have a first polarization; and
second reflecting means for reflecting the optical signal such that the optical signal traverses the predetermined path or a path parallel thereto for a second time through the birefringent assembly, in an opposite direction to the first time.

17. The apparatus of claim 16 wherein the optical signal comprises a wavelength division multiplexed (WDM) optical signal.

18. The apparatus of claim 16 wherein the birefringent assembly comprises a single birefringent crystal.

19. The apparatus of claim 16 wherein the birefringent assembly comprises a multiple birefringent crystals.

20. The apparatus of claim 19 wherein the birefringent assembly comprises a $TiO_2$ crystal and a $YVO_4$ crystal.

21. The apparatus of claim 16 wherein the first subset of optical channels comprises odd International Telecommunications Union (ITU) channels or even ITU channels.

22. The apparatus of claim 16, further comprising third reflecting means for reflecting an optical signal such that the optical signal traverses the predetermined path or a path parallel thereto for a third time.

* * * * *